G. DUNCAN.
AUTOMOBILE DEVICE.
APPLICATION FILED APR. 30, 1913.
1,088,554.
Patented Feb. 24, 1914.
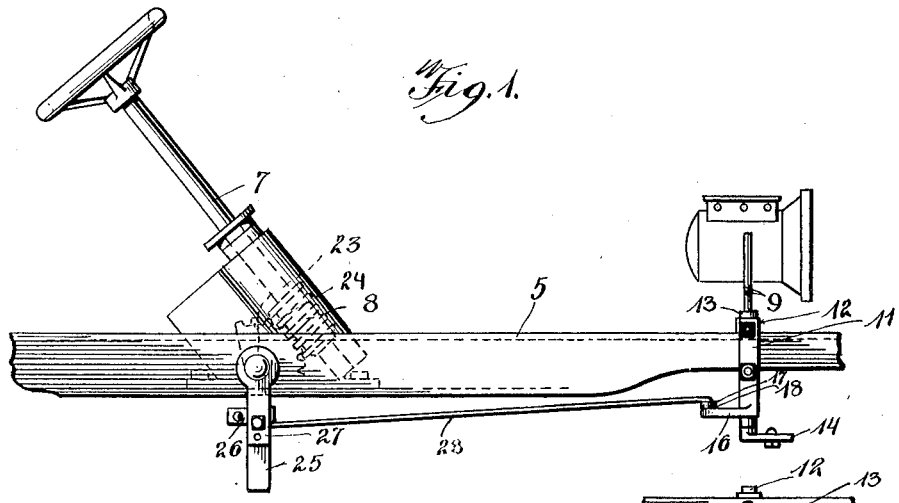
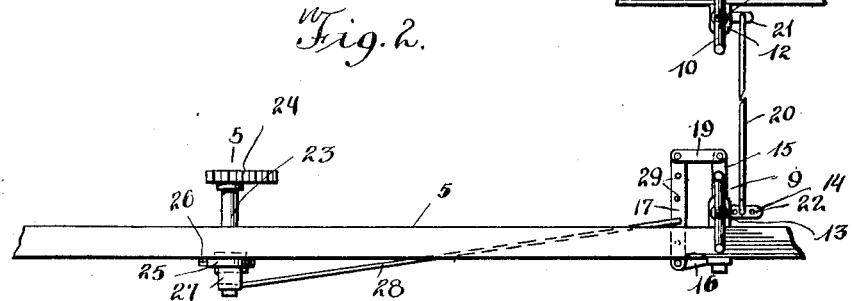
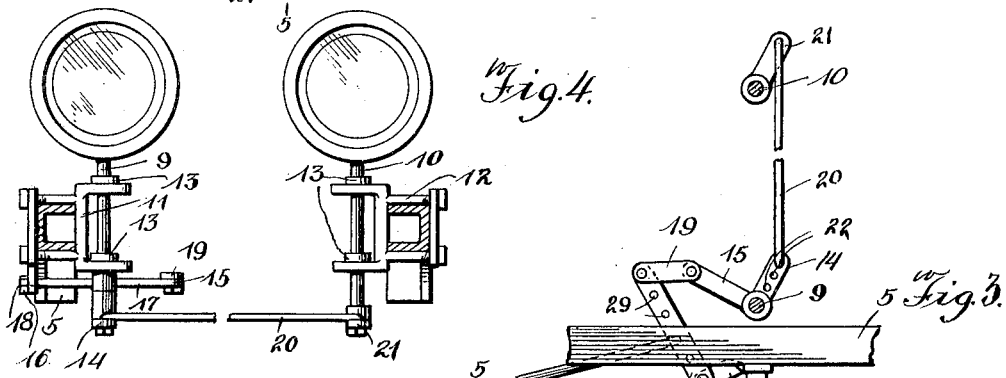
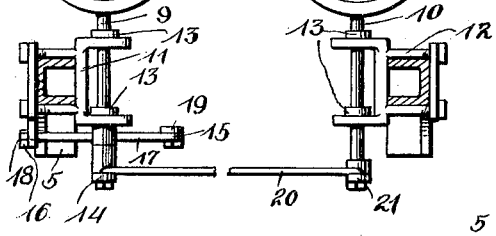
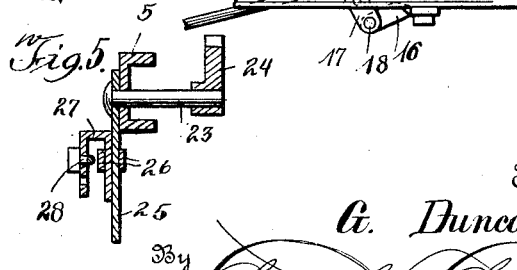
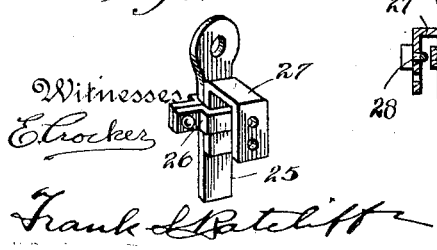
Witnesses
E. Crocker
Frank L. Ratcliff
Inventor
G. Duncan
By Chandlee & Chandlee
Attorneys

UNITED STATES PATENT OFFICE.

GAVIN DUNCAN, OF WALLA WALLA, WASHINGTON.

AUTOMOBILE DEVICE.

1,088,554. Specification of Letters Patent. Patented Feb. 24, 1914.

Application filed April 30, 1913. Serial No. 764,630.

*To all whom it may concern:*

Be it known that I, GAVIN DUNCAN, a citizen of the United States, residing at Walla Walla, in the county of Walla Walla, State of Washington, have invented certain new and useful Improvements in Automobile Devices; and I do hereby declare the following to be a full, clear, and exact description of the invention, such as will enable others skilled in the art to which it appertains to make and use the same.

This invention relates to new and useful improvements in means for turning the head lights of a vehicle in the direction in which the vehicle is being steered.

The object of the invention resides in the provision of means for turning the head lights of a vehicle in the direction in which the said vehicle is being steered, said means being actuated simultaneously with the movement of the steering mechanism.

A further object of the invention resides in the provision of means whereby the degree in which the lamps are turned with relation to the movement of the steering mechanism may be varied.

A still further object of the invention resides in the provision of means operable directly by the steering column for actuating the said mechanism to turn the head lights.

With these and other objects in view, the invention resides in the novel combination, formation, and arrangement of parts more fully hereinafter described and illustrated in the accompanying drawings and particularly pointed out in the claims hereto appended.

Reference is had to the accompanying drawings, wherein similar characters of reference designate corresponding parts throughout the several views, and in which:

Figure 1 is a side elevation of the device applied to the chassis of an automobile or operably connected to the worm on the steering wheel, Fig. 2 is a top plan view of what is shown in Fig. 1, Fig. 3 is a sectional view on the line 3—3 of Fig. 1 and showing the head lamp brackets burned laterally with respect to the chassis, Fig. 4 is a front elevational view of the device, Fig. 5 is a sectional view on the line 5—5 of Fig. 2, and Fig. 6 is a detail perspective view showing the means for operatively connecting the mechanism carried by the lamp brackets and the means connected to the steering wheel.

Referring now more particularly to the accompanying drawings, 5 designates the side sills of an automobile chassis. Carried by the intermediate portions of the chassis is the usual steering column 7 having at its lower end a worm 8 for actuating the lamp turning means to be hereinafter described. Secured on the forward portions of the sills are brackets 11 and 12 having inwardly extending arms through which are passed the shank portions of the lamp carrying brackets 9 and 10. The arms of the brackets 11 and 12 are provided with ball bearings and cone members 13 which are carried by the said shanks to engage the balls.

The lamp bracket 9 is provided adjacent its lower end with a lateral extension 14 and provided at its lower end with an extension 15, said extensions being disposed substantially at right angles to each other. The supporting bracket 11 carries a rearwardly extending arm 16 which is disposed below the sill. A link 17 is pivoted at one end to the free end of this arm and a link 19 has its ends pivotally connected to the other end of the link 17 and to the free end of the arm 15. It is thus observed that by oscillating the link 17, the lamp bracket 9 will be consequently oscillated.

To impart oscillating movement of the lamp bracket 9 to the lamp bracket 10 so that both lamps are carried simultaneously, the bracket 10 is provided at its lower end with a lateral arm 21 similar to the arm 14, both the arms being forwardly directed and pivotally connected at their free ends by a link 20. The arm 14 is provided with a plurality of openings with which the link is adapted to be pivotally associated whereby the swinging movement of the bracket 10 with relation to the bracket 9 may be adjusted.

The means for oscillating the lever 17 and thus simultaneously oscillating the lamp brackets includes a shaft 23 journaled intermediate at its ends in one side 5 of the chassis and carrying at its inner end a segmental gear 24 meshing with the worm 8 whereby movement of the steering column to steer the machine will also rotate the shaft 23. Fixed to the shaft outwardly of the sill is a depending arm 25 to which is detachably held by a clamping band 26 one of the arms of a U-shaped member 27. A link 28 is secured to the other arm of the U-shaped member and has its other end selectively pivotally associated with one of a plurality of openings 29 in the link 17. As the steering wheel is turned in either direction, the shaft 23 is rotated and through the arm 25 either pulls the link 28 forwardly or backwardly to similarly move the link 17 whereby the lamp brackets 9 and 10 are directed either to the right or to the left. By the provision of the U-shaped member 27 it is observed that the movement of the link 28 relative to the rotation of the shaft 23 may be varied.

From the foregoing it is observed that a comparatively simple and very efficient structure is provided which permits of a full degree of adjustment.

What is claimed is:

1. A dirigible headlight mechanism comprising the combination with the chassis of a vehicle, of a pair of supporting brackets secured thereto, a rearwardly directed arm at the lower end of one of the brackets, lamp brackets pivotally carried by said brackets, vertically spaced lateral arms at the lower end of one of the lamp brackets, a lateral arm at the lower end of the other lamp bracket, a link connecting said last-mentioned arm and one of the arms of the other lamp bracket, a second link pivoted to the arm of the supporting bracket, a third link pivotally connecting the other end of the second link and the other arm of said other lamp bracket and means for oscillating the second link.

2. A dirigible headlight mechanism comprising the combination with a chassis, of lamp brackets pivoted at the forward end thereof, a link pivotally secured to the chassis, means associated with said link and the lamp brackets whereby oscillation of the link will oscillate the brackets, a shaft carried by the chassis, means for rotating said shaft upon rotation of the steering wheel, a depending arm on the shaft, a U-shaped member having one arm adjustably clamped on said depending arm, and a link pivoted to the U-shaped member and pivoted to the first named link.

In testimony whereof, I affix my signature, in the presence of two witnesses.

GAVIN DUNCAN.

Witnesses:
T. P. GOSE,
AVIS BENNETT.

---

Copies of this patent may be obtained for five cents each, by addressing the "Commissioner of Patents, Washington, D. C."